(12) United States Patent
Gilliland

(10) Patent No.: US 7,137,488 B2
(45) Date of Patent: Nov. 21, 2006

(54) DISK BRAKE CALIPER HAVING RE-ENFORCING BRIDGE

(76) Inventor: Warren Gilliland, 838 Calle Plano, Camirillo, CA (US) 93012

( * ) Notice: Subject to any disclaimer, the term of this patent is extended or adjusted under 35 U.S.C. 154(b) by 0 days.

(21) Appl. No.: 11/108,425

(22) Filed: Apr. 18, 2005

(65) Prior Publication Data

US 2006/0231353 A1    Oct. 19, 2006

(51) Int. Cl.
*F16D 55/00* (2006.01)
(52) U.S. Cl. .................................... 188/73.47; 188/71.1
(58) Field of Classification Search ............ 188/73.31, 188/71.1, 73.1, 73.43, 73.44, 73.45, 73.47
See application file for complete search history.

(56) References Cited

U.S. PATENT DOCUMENTS 5,168,964 A * 12/1992 Shimmell ................. 188/72.4
5,249,649 A * 10/1993 Emmons ................. 188/73.47
5,515,948 A    5/1996 Gilliland
5,875,873 A *  3/1999 Kay et al. ................ 188/73.38
6,719,104 B1 * 4/2004 Wemple et al. ............ 188/73.1

FOREIGN PATENT DOCUMENTS

GB    2087490 A  *  5/1982

* cited by examiner

*Primary Examiner*—Thomas J. Williams
(74) *Attorney, Agent, or Firm*—Trojan Law Offices

(57) ABSTRACT

A brake apparatus includes a caliper with two housing members secured together by a C-section bridge. The housing members straddle a rotor, so as to be able to urge one or more pistons disposed therein to apply brake pads against the rotor, thereby effectuating a braking force on the rotor. The C-section bridge provides support for the members and reduces the clamshell effect generated by application of the breaking force.

2 Claims, 3 Drawing Sheets

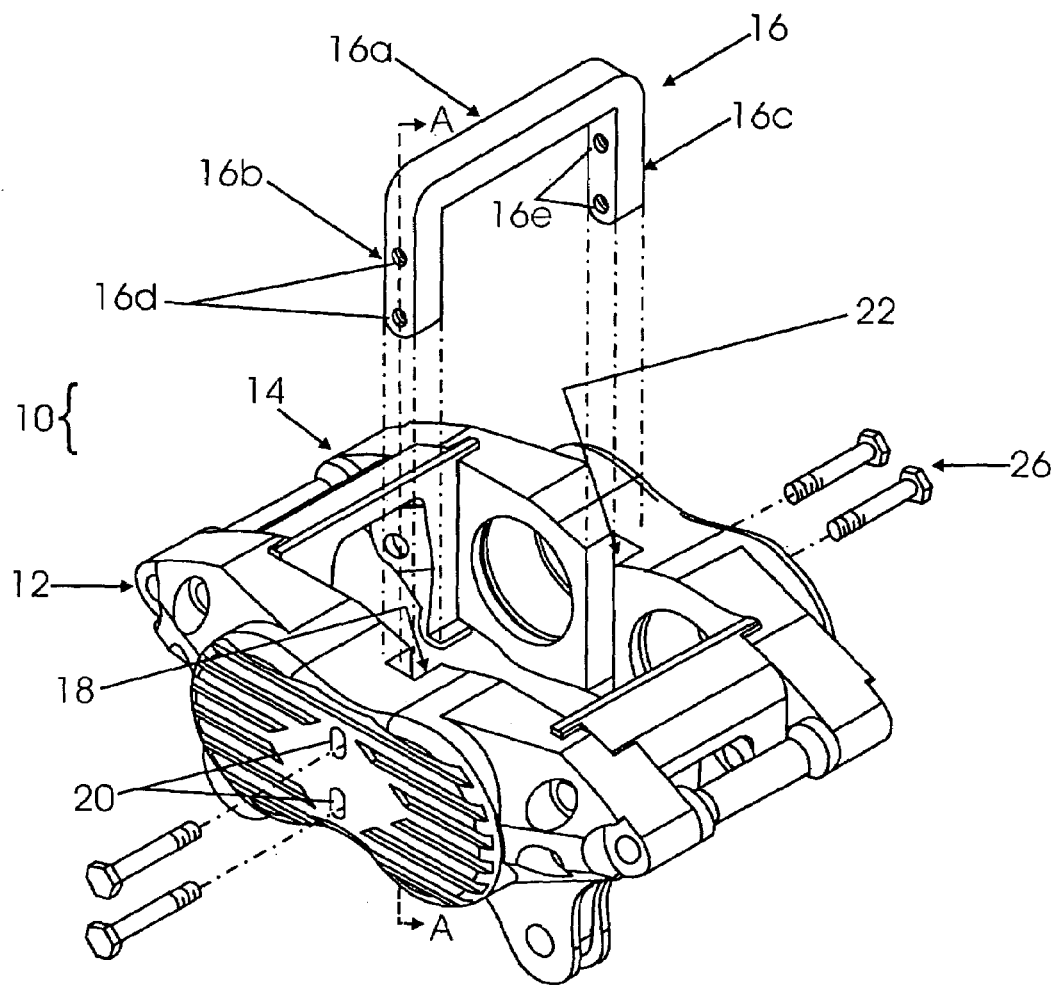
Fig.3
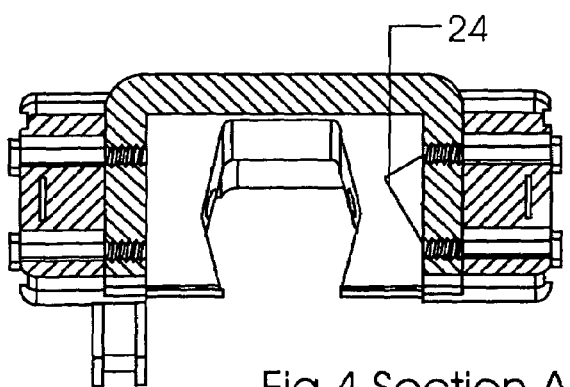
Fig.4 Section A-A

US 7,137,488 B2

DISK BRAKE CALIPER HAVING RE-ENFORCING BRIDGE

BACKGROUND OF THE INVENTION

This invention relates generally to a vehicular disk brake apparatus and more particularly to the brake caliper thereof, which has a reinforced bridge for reducing load.

In general, a vehicular or automotive brake operates on a hydraulic system, in which the depression of a brake pedal causes a plunger in the master cylinder to push hydraulic fluid to a braking unit at the wheels. A disk brake is one kind of braking unit. In a conventional opposed caliper disk brake, a fixed caliper straddles a rotor, which is attached to the wheel. In a floating caliper disk brake, the caliper urges piston or pistons on one side of the rotor to apply a pad, while at the same time pushing the caliper housing away from the rotor, drawing the outboard pad up to the rotor. In either case, when fluid from the master cylinder is introduced into the caliper, it urges one or more pistons in the caliper to apply brake pad(s) against the rotor, thereby effectuating a braking force on the rotor and causing the wheel to slow down or stop.

A typical caliper is formed in the shape of a clam for straddling the rotor. Current designs either utilize a one piece housing, or two pieces, slit over the top of the rotor and held together by bolts. In straddling the rotor, one member is disposed on the inboard side of the rotor and the other member is disposed on the outboard side of the rotor. The members have piston(s) disposed therein.

A basic problem in calipers of this type is that they are subject to high shearing and bending forces, with the load bearing on the bridge section. When such forces are transmitted through the caliper, they act to spread the caliper apart like a clam, a phenomenon often referred to as the "clam shell" effect. The result is decreased braking efficiency, as some of the force generated by the master cylinder is lost in the spreading of the caliper, and there is also the consequent effect of increasing pedal travel, tapered pad wear, spongy pedal and loss of modulation.

To minimize this deflection, caliper designs have typically utilized either a monoblock or a bolting design. For example, in a monoblock caliper, the caliper is formed from a solid body with a bridge section integrally joining the inboard and outboard members of the caliper housing. This type of caliper requires a rather massive bridge section to effectively reduce the clam shell effect that causes the caliper to open at the bottom. A massive bridge is undesirable, however, as it gets in the way of maximizing the rotor diameter.

In a caliper where the members are connected by bolts, as shown in FIG. 1, there is still a clam shell effect, resulting in the pad cocking with respect to the rotor face, which causes an increase in pad drag and wear, and a decrease in braking efficiency. The key stress area of a caliper is typically within the pad boundaries, within the pistons. Although the use of a bolting connection may limit the growth of the outer portion of the caliper, it does nothing to stop the deflection below. In other words, the bottom of the caliper is free to open, and when subjected to high pressures, will still clamp back down on the rotor causing the pad to attempt to wedge into the rotor, causing taper.

For the foregoing reasons, there is a need for a disk brake assembly having a brake caliper that is sufficiently stiff to reduce the clam shell effect.

SUMMARY OF THE INVENTION

The present invention is directed to an improved brake caliper that satisfies the need for reducing the clam shell effect. A disk brake apparatus having the features of the present invention comprises a rotor and a brake caliper for applying braking force to the rotor. The brake caliper is basically comprised of a first housing member and second housing member straddling the rotor, with the first and second members connected by a bridge. The caliper housing members have actuating pistons disposed therein, with brake pads associated therewith for engaging the rotor.

The bridge is generally comprised of a cross member and associated anchors. For example, in a preferred embodiment as shown in FIG. 3, the bridge is formed in the shape of the letter "C" with a cross member and two anchor members. As shown in the preferred embodiment, the anchor members are downward turning arms. This type of bridge is generally referred to as a C-section bridge because of its shape. In this type of bridge, the arms can be integrally formed with respect to the cross member, or they can be separate members fixedly connected to the cross member.

Further, it is to be understood that while the C-section shape is the preferred embodiment, the bridge can take a variety of form and shape that incorporates the basic combination of cross member and associated anchors. As an example, the bridge can be comprised of a cross member and anchor plates. As another example, the bridge can take the shape of the letter "Y" with two anchor arms spread at an angle and joined by a vertical member. Moreover, the cross member can take various shape, such as tubular or, as shown in figure FIG. 3, rectangular. In short, various modifications of the bridge may be contemplated without departing from the spirit and scope of the invention as defined by the claims below.

The bridge, as such, provides structural support for the caliper housing members. The caliper housing is commonly made of low tensile strength materials in order to reduce weight, as the weight of the caliper, which tends to be relatively heavy, can affect the operation and suspension of the chassis. However, a low strength caliper will have low load capacity and low structural stiffness. The C-bridge provides structural rigidity by using high tensile strength materials, creating a "bending moment" situation, which improves support to the low strength caliper housing members. By using high strength materials only where needed, the strength of the caliper can be maximized while still minimizing weight.

One key advantage of the present invention to be noted is the use of high tensile strength anchors (i.e. the downward turning arms) in between the pistons of the caliper, especially as assembled to the center portion of the caliper. The use of high strength downward turning arms allows for a stronger bridge design to reduce deflection.

Structurally, the first and second members each have at least one channel provided therein respectively for receiving the anchor members of the bridge, and at least one hole formed therein respectively in substantial alignment with the channels. The bridge has at least two holes formed in the anchor members. The bridge anchor members are capable of fitting flush in the channels of the first and second members, such that the holes in the bridge anchor members coaxially align with the holes in the first and second members. A securing means, such as a bolt, capable of passing through the holes in the first and second caliper housing members and engaging the holes in the bridge, acts to secure the first member and second member to the bridge.

In another embodiment of the brake caliper, the first and second members are secured by a plurality of bridges. Accordingly, the first and second members include a plurality of channels therein for receiving the anchor members of the bridges and a plurality of holes and securing means for connected the bridges to the first and second members.

In yet another embodiment of the invention, first and second members of the brake caliper do not have channels formed therein. Instead, the outside face of the bridge abuts the inside face of the first and second members, such that the holes in the bridge coaxially align with the holes the in first and second members. In this embodiment, the bridge extends into the pad area between the housing members. As such, the bridge could provide additional pad support and retention. This would increase the center rigidity by increasing the cross-section thickness.

An advantage of using a bridge such as the C-section is that it provides superior rigidity, which correspondingly would require less master cylinder volume to fill the pistons since deflection in the caliper is reduced.

DRAWINGS

FIG. 3 is a partially exploded perspective view of the break caliper according to an embodiment of the present invention.

FIG. 4 is a cross-section view of an embodiment of the present invention.

DETAILED DESCRIPTION

Figure 1:
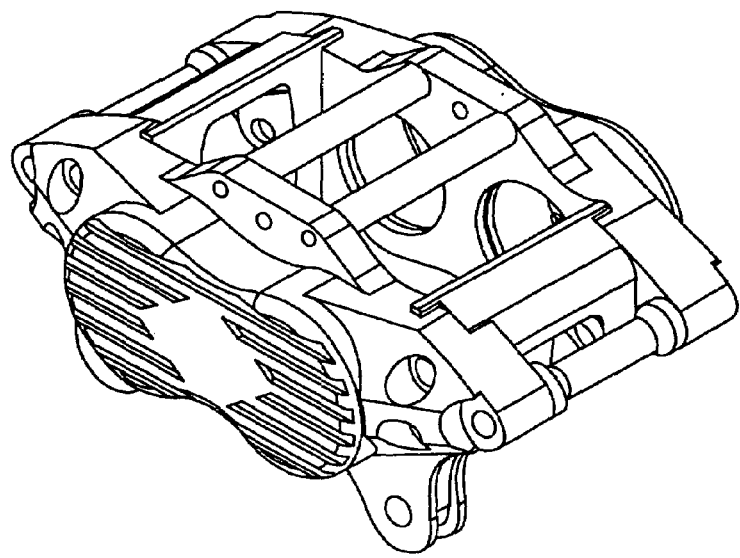
FIG. 1 is a perspective view of a prior art brake caliper.
Figure 2:
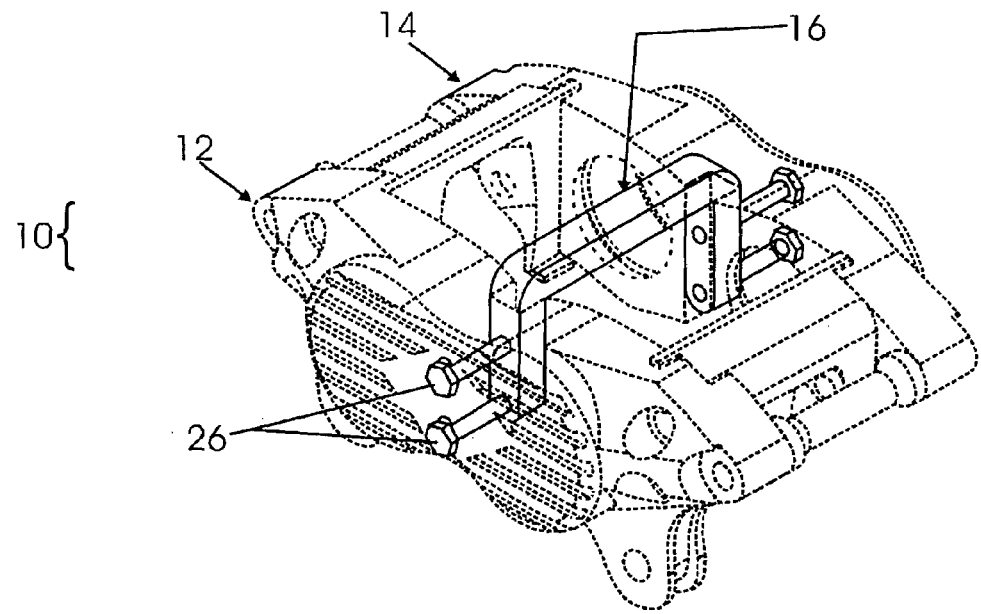
FIG. 2 is a perspective view of a brake caliper according to an embodiment of the present invention.

A preferred embodiment of a brake caliper is shown in FIGS. 2 and 3. Referring to FIG. 2, the brake caliper 10 has first member 12 and second member 14 straddling the rotor (not shown), with first and second members 12, 14 connected by a bridge 16. FIG. 2 shows brake caliper 10 with bridge 16 connected to first and second members 12, 14. FIG. 3 shows a partially exploded view of brake caliper 10 with bridge 16 unconnected to first and second members 12, 14. It is to be noted that although FIGS. 2 and 3 show a C-section bridge 16, the bridge can take a variety of form and shape that incorporate the basic combination of cross member and associated anchors.

Referring to FIG. 3, C-section bridge 16 is generally comprised of a cross member 16a and associated anchor arms 16b and 16c. The C-section bridge 16 has at least one hole 16d in arm 16b and at least one hole 16e in arm 16c. The first member 12 has at least one channel 18 provided therein for receiving arm 16b of C-section bridge 16, and at least one hole 20 formed therein in substantial alignment with channel 18. Likewise, second member 14 also has at least one channel 22 provided therein for receiving arm 16c and also at least one hole 24 (as shown in FIG. 4) formed in substantial alignment with channel 22. Referring to FIGS. 3 and 4, the anchor arms 16b, 16c of C-section bridge 16 are capable of fitting flush in channels 18, 22 of first and second members 12, 14, such that holes 16d, 16e in C-section bridge 16 coaxially align with holes 20, 24 in first and second members 12, 14. A securing means 26 passing through holes 20, 24 and engaging holes 16d, 16e secures first member 12 and second member 14 to C-section bridge 16.

Figure 5:
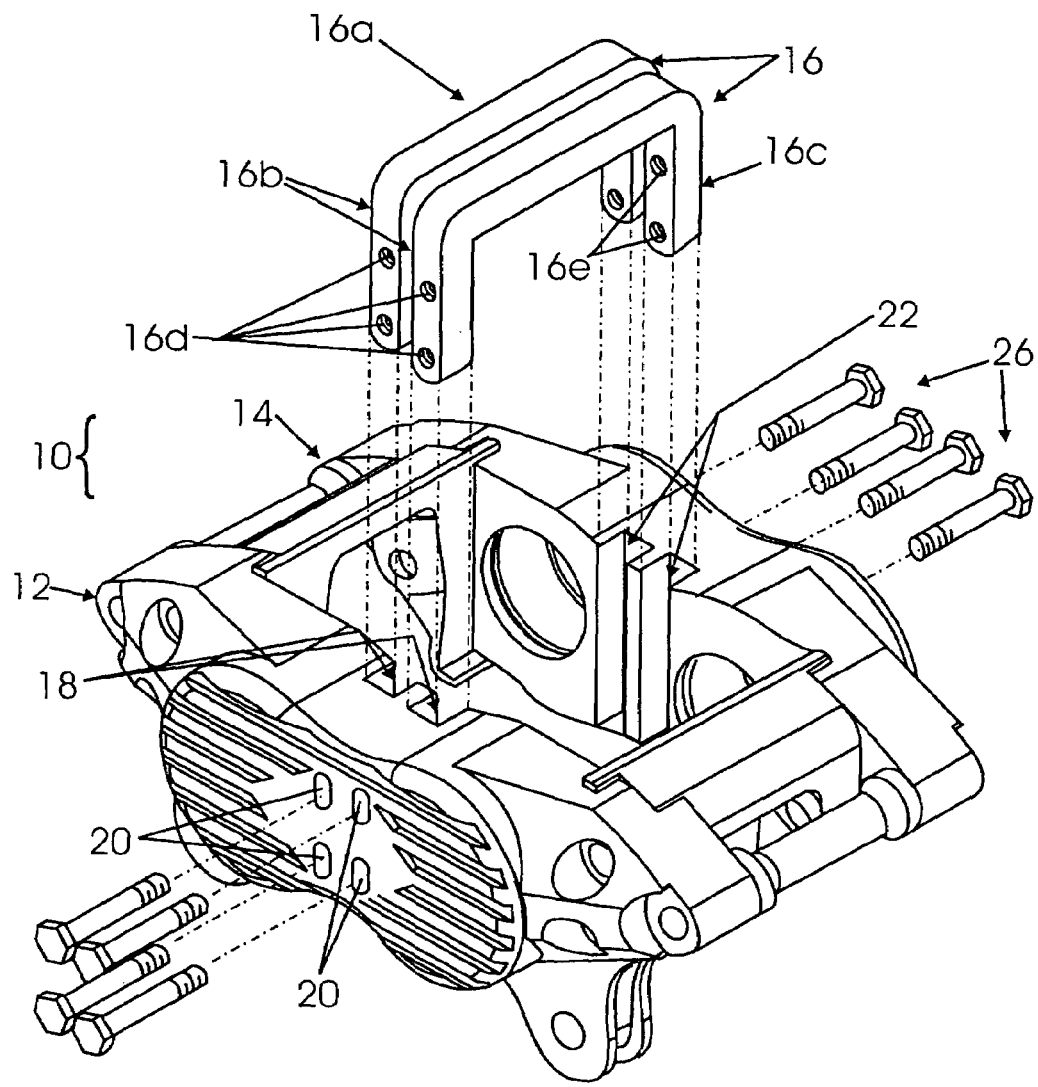
FIG. 5 is a perspective view of an embodiment of the present invention.

First and second members 12, 14 can also be secured by a plurality of C-section bridges 16 as shown in FIG. 5. Accordingly, first and second members 12, 14 would include a plurality of channels 18, 22 therein for receiving anchor arms 16b, 16c, and a plurality of holes 20, 24 for securing means 26 to connect C-section bridges 16 to first and second members 12, 14.

In another embodiment of the invention, first and second members 12, 14 of brake caliper 10 do not have channels 18, 22 formed therein. Instead, the outside face of C-section bridge 16 abuts the inside face of first and second members 12, 14, such that holes 16d, 16e in C-section bridge 16 coaxially align with holes 20, 24 in first and second members 12, 14.

The embodiments described herein demonstrate an improved brake caliper having reinforced bridge. This brake caliper design will reduce the clam shell effect. Although the present invention has been described in considerable detail with reference to certain preferred versions thereof, other versions are possible. Therefore, the spirit and scope of the appended claims should not be limited to the description of the preferred versions contained therein.

What is claimed is:

1. A brake caliper for applying braking force to a rotor, said brake caliper having first and second members straddling said rotor, said first and second members connected by at least one bridge, said bridge having at least one cross member and at least two anchor members, each said anchor member having at least one hole formed therein, wherein said bridge is removably connected to said first and second members, wherein said first member includes at least one channel provided therein for receiving an anchor member of said bridge, said first member further having at least one hole formed therein in substantial alignment with said channel;

wherein said second member includes at least one channel provided therein for receiving an anchor member of said bridge, said second member further having at least one hole formed therein in substantial alignment with said channel;

wherein said anchor members of said bridge capable of fitting in said channel of said first member and said channel of said second member, such that said holes in said anchor members coaxially align with said hole in said first member and said hole in said second member;

wherein a securing means is capable of passing through said hole in said first member and engaging said hole in said bridge for securing said first member to said bridge; and a securing means is capable of passing through said hole in said second member and engaging said hole in said bridge for securing said second member to said bridge.

2. A brake caliper for applying braking force to a rotor, said brake caliper having first and second members straddling said rotor, said first and second members connected by at least one bridge, said bridge having at least one cross member and at least two anchor members, each said anchor member having at least one hole formed therein, wherein said bridge is removably connected to said first and second members, said first member includes at least one hole formed therein;

wherein said second member includes at least one hole formed therein;

wherein said bridge includes two anchor members;

wherein each said anchor member of said bridge having at least one hole formed therein;

wherein said bridge capable of abutting said first member and said second member, such that said holes in said anchor members coaxially align with said hole in said first member and said hole in said second member;

wherein a securing means is capable of passing through said hole in said first member and engaging said hole in said anchor member for securing said first member to said bridge; and a securing means is capable of passing through said hole in said second member and engaging said hole in said bridge for securing said second member to said bridge.

* * * * *